Oct. 11, 1960     C. B. SIGHTS     2,955,798
COMPACT LOW-IMPEDANCE TUBULAR VALVE
Original Filed Oct. 6, 1951
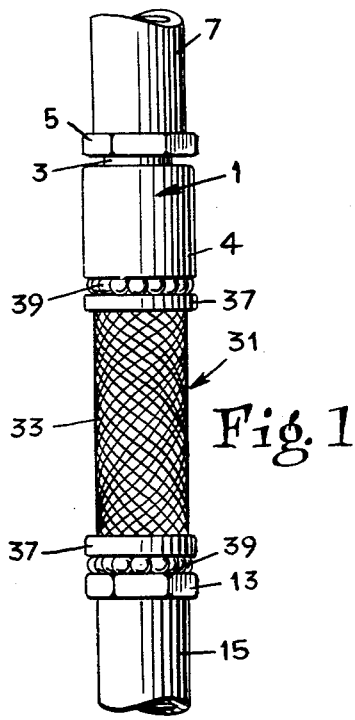
Fig. 1
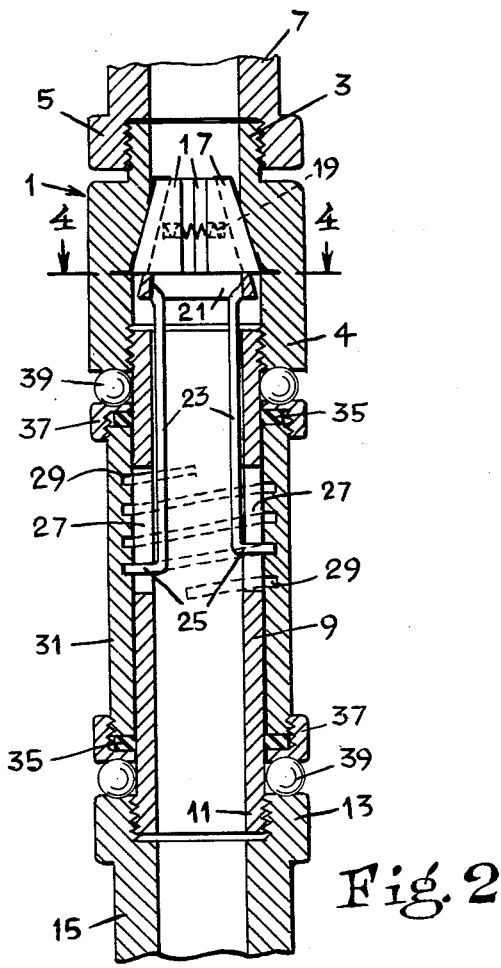
Fig. 2
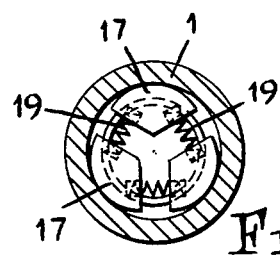
Fig. 4
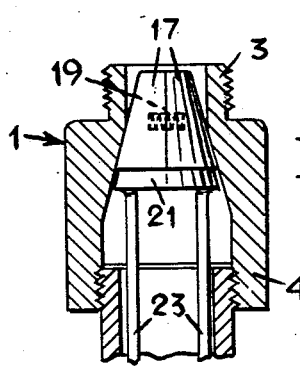
Fig. 3
Fig. 5
INVENTOR:
Charles B. Sights,
BY
Ralph P. Staubly
ATTORNEY.

2,955,798

COMPACT LOW-IMPEDANCE TUBULAR VALVE

Charles B. Sights, 2814 22nd Ave. S., Nashville, Tenn.

Substituted for abandoned application Ser. No. 250,138, Oct. 6, 1951. This application July 31, 1958, Ser. No. 753,175

1 Claim. (Cl. 251—212)

This invention relates to a compact low-impedance tubular valve.

This application is a refiling of application 250,138, Oct. 6, 1951, now abandoned.

Generally speaking valves should (1) be easily and quickly operable between a fully closed position and a low-impedance or "full-flow" open position in which there is minimal constriction or impedance of the fluid stream, but at the same time should (2) be of small, simple, durable, yet inexpensive construction. Valves of the prior art have not been able to satisfy both sets of desiderata, but rather have usually been able to obtain the advantages of one set only at a sacrifice of those of the other.

The disclosed invention combines both sets of advantages to a degree not possible with prior-art valves.

It is accordingly an object of this invention to provide a full-flow valve which is at the same time compact and "streamlined."

It is a further object to provide a full-flow valve which is of simple, durable, yet inexpensive, construction.

It is a still further object of the invention to provide a full-flow valve of tubular construction which is not of appreciably greater diameter than the conduit it valves, and which is operable by a sleeve closely and rotatably surrounding itself.

These and other objects and advantages of the invention will become apparent as the description proceeds.

In the drawings, which illustrate a preferred embodiment of the invention, and in which like reference numerals designate like parts thruout the several views:

Fig. 1 is an elevational view of the valve in a typical installation.

Fig. 2 is an enlarged elevational axial cross-sectional view of the installation of Fig. 1, the valve being "open."

Fig. 3 is a view like that of Fig. 2 but showing only the valve elements proper, with said elements in "closed" position.

Fig. 4 is a plan view in section taken on the line 4—4 of Fig. 2.

Fig. 5 is a perspective view of one of the tapered valve jaws.

With reference now to the drawings, which disclose a preferred form of the invention, the numeral 1 designates the valve-chamber-forming member. This chamber member has a reduced-diameter internally threaded standard connector 5 carried by the conduit or pipe 7 by which the valve is connected to or in a fluid system. The pipe 7 and the reduced-diameter portion 3 of the chamber member 1 preferably have the same internal diameter. An extension tube or pipe 9 of the same diameter is threadedly connected to the lower end 4 of the chamber member 1 (but obviously could be formed integrally therewith), the conduits of said parts 1, 7 and 9 being alined co-axially. The lower end of tube 9 is threaded at 11 for connection to part 13 of another conduit section 15 similar to part 7.

The chamber in the member 1 is conically tapered as shown in Figs. 2 and 3, having a relatively smooth accurately machined surface against which a plurality of conduit-closing jaw members 17 seat. The jaw members 17 in their conduit-closing position (Fig. 3) form a truncated cone having the same taper as the conical chamber in the member 1. The jaws 17 are urged toward the expanded or open-valve position of Figs. 2 and 4 by coiled compression springs 19. The jaws 17 are movable to the valve-closing position of Fig. 3 by a ring 21 bearing against their bottom surfaces.

The ring 21 is vertically movable by a pair of arms 23, which extend into the tube 9 and have outwardly extending fingers 25 on their lower ends. The arms 23 are resilient whereby they may be sprung toward each other enough to permit the outwardly bent fingers 25 to enter the upper end of tube 9 for passage therethru until they reach diametrically opposite and longitudinally extending slots 27 in tube 9. The fingers 25 extend outwardly thru these slots 27 and enter a helical groove or internal thread 29 in the sleeve 31, which surrounds the central portion of tube 9 sufficiently loosely for co-axial rotation therearound. The sleeve 31 is provided with a friction-grip surface, by being knurled (33, Fig. 1) or by having an added covering of rubber, leather, cloth, etc. (not shown).

To prevent leakage of fluid from tube 9 thru slots 27 and thence outwardly between tube 9 and sleeve 31 to the outside of the valve, there is provided at each end of the sleeve 31 a sealing ring-gasket 35 of leather, silicone rubber, or other suitable resilient material. The gaskets 35 are compressed against the ends of the sleeve 31 and against the outer surface of the tube 9 by ferrules 37 threadedly and thus adjustably connected to the ends of sleeve 31.

The rotatable sleeve 31 is provided with thrust bearings 39 to prevent its longitudinal displacement along the tube 9. For purpose of illustration only, these bearings 39 have been shown as a series of balls riding in circular grooves in the opposed end surfaces of the ferrules 37 and of the end 4 of chamber 1 and the end of portion 13 of conduit section 15.

In use the valve may be connected for fluid flow in either direction. In one direction the fluid pressure will assist in opening the valve, while in the other it will assist the closing action.

It is desired to point out that for large valves of this type, for example, those having internal diameters of 3 to 6 inches or more, it may be desirable to add a detachable (or permanently attached) handle or handles (not shown) radially extending outwardly to supply the leverage necessary for easy turning against the friction between the gaskets 35 and tube 9.

While I have disclosed a preferred form in which my invention may be reduced to practice, it is to be understood that many changes may be made in the construction and arrangement of the parts, without departing from the spirit of the invention, as defined by the subjoined claim.

Having thus described my invention, I claim:

A low impedance tubular valve adapted for insertion co-axially in a fluid line, comprising: a conduit member having a conical valve chamber therein; a plurality of sector-shaped jaw elements disposed within, and about the axis of, said valve chamber, means for moving said jaw elements radially outwardly and axially of said conduit member to open said valve, said jaw elements being also movable together to form a conical plug to completely close the fluid passage thru said valve chamber; means longitudinally movable within said conduit member for controlling the valve-opening movement of said jaw elements and also for moving them to valve-closing position; and sleeve means surrounding, mounted on, and rotatable around the exterior of said conduit member and connected to said longitudinally movable means for moving the same, said valve being free of lateral protuberances and having an over-all diameter not substantially greater than that of said conduit, said sleeve means having a helical groove on its inner surface for engagement with at least one protuberance extending from said longitudinally movable means thru a longitudinal slot in said conduit member.

References Cited in the file of this patent

UNITED STATES PATENTS

| | | |
|---|---|---|
| 674,971 | Kimman | May 28, 1901 |
| 2,016,998 | Hartke | Oct. 8, 1935 |
| 2,693,338 | Grunt | Nov. 2, 1954 |